US012638556B2

(12) United States Patent
Blahnik et al.

(10) Patent No.: US 12,638,556 B2
(45) Date of Patent: May 26, 2026

(54) LiDAR DEVICE FOR SCANNING MEASUREMENT OF A DISTANCE TO AN OBJECT

(71) Applicant: Scantinel Photonics GmbH, Ulm (DE)

(72) Inventors: Vladan Blahnik, Oberkochen (DE); Holger Münz, Aalen (DE); Martin Peschka, Aalen (DE)

(73) Assignee: Scantinel Photonics GmbH, Ulm (DE)

( * ) Notice: Subject to any disclaimer, the term of this patent is extended or adjusted under 35 U.S.C. 154(b) by 281 days.

(21) Appl. No.: 18/291,547

(22) PCT Filed: Jul. 18, 2022

(86) PCT No.: PCT/EP2022/070036
§ 371 (c)(1),
(2) Date: Jan. 23, 2024

(87) PCT Pub. No.: WO2023/006470
PCT Pub. Date: Feb. 2, 2023

(65) Prior Publication Data
US 2025/0093592 A1      Mar. 20, 2025

(30) Foreign Application Priority Data
Jul. 27, 2021     (EP) .................................... 21187955

(51) Int. Cl.
*G01S 7/481*         (2006.01)
*G01S 17/32*        (2020.01)
(Continued)

(52) U.S. Cl.
CPC .......... *G01S 7/4815* (2013.01); *G01S 7/4817* (2013.01); *G01S 17/32* (2013.01); *G01S 17/48* (2013.01);
(Continued)

(58) Field of Classification Search
CPC ...... G01S 7/4817; G01S 7/4815; G01S 17/42; G01S 17/89; G01S 17/931; G01S 17/32;
(Continued)

(56) References Cited

U.S. PATENT DOCUMENTS 10,545,289 B1 *  1/2020  Chriqui ................... G02B 6/34
11,579,356 B2 *  2/2023  Swanson ................ G01N 21/17
(Continued)

FOREIGN PATENT DOCUMENTS

DE        102020110142 A1    10/2021
WO      WO-2021029969 A1 *   2/2021   .......... G02B 6/1228
WO      WO 2023006470 A1    2/2023

OTHER PUBLICATIONS

Scantinel Photonics GMBH, Extended European Search Report, EP Patent Application No. 21187955.6, Jan. 20, 2022, 9 pgs.
(Continued)

*Primary Examiner* — Michelle R Connelly
(74) *Attorney, Agent, or Firm* — Kevin D. Wills

(57)        ABSTRACT

A LiDAR device (14) for scanning measurement of a distance to an object (12) comprises a photonic integrated circuit (52) with a plurality of optical waveguides (38) and a plurality of couplers 40. Each coupler (40) emits light guided in the optical waveguide (38) into free space and/or couples light propagating in free space into the optical waveguide (38). A collimating optical system (44) collimates light beams emitted by the couplers (40) and/or focuses collimated light beams. Microlenses (54; 54a, 54b) form real or virtual images of associated couplers (40), said images being arranged in an object field (56) of the collimating optical system (44). The collimating optical system (44) has a collimator numerical aperture which is greater than each of the coupler numerical apertures. Each microlens (54; 54a, 54b) has a collimator-side numerical aperture
(Continued)

that is greater than its coupler-side numerical aperture. In this manner, insertion losses caused by NA mismatch are reduced.

15 Claims, 6 Drawing Sheets

(51) Int. Cl.

| | |
|---|---|
| *G01S 17/48* | (2006.01) |
| *G01S 17/89* | (2020.01) |
| *G01S 17/931* | (2020.01) |
| *G02B 6/32* | (2006.01) |
| *G02B 6/42* | (2006.01) |

(52) U.S. Cl.
CPC ................ *G01S 17/89* (2013.01); *G02B 6/32* (2013.01); *G02B 6/4206* (2013.01); *G01S 17/931* (2020.01)

(58) Field of Classification Search
CPC .... G01S 7/4818; G01S 7/4814; G01S 7/4816; G01S 17/894; G01S 7/481; G01S 7/4812; G01S 7/4863; G01S 17/58; G01S 17/88; G01S 17/90; G01S 17/003; G01S 17/34; G01S 17/36; G02B 6/32; G02B 26/101; G02B 6/12004; G02B 6/262; G02B 6/1228; G02B 2006/12102; G02F 1/292; G02F 1/2955; B60W 2420/408
See application file for complete search history.

(56) References Cited

U.S. PATENT DOCUMENTS

| | | | | |
|---|---|---|---|---|
| 11,796,680 | B2 * | 10/2023 | Wu ........................ | G01S 7/4813 |
| 12,140,676 | B2 * | 11/2024 | Seok ..................... | H10F 77/407 |
| 12,313,790 | B2 * | 5/2025 | Sutton .................... | H10F 77/40 |
| 12,379,605 | B2 * | 8/2025 | Lee ..................... | G02B 27/0966 |
| 2013/0206967 | A1 | 8/2013 | Shpunt et al. | |
| 2017/0371227 | A1 | 12/2017 | Skirlo et al. | |
| 2018/0329060 | A1 | 11/2018 | Pacala et al. | |
| 2019/0377135 | A1 | 12/2019 | Mansouri Rad et al. | |
| 2021/0116703 | A1 | 4/2021 | Pulikkaseril et al. | |
| 2021/0165102 | A1 | 6/2021 | Crouch et al. | |
| 2021/0316756 | A1 | 10/2021 | Davydenko | |
| 2022/0146903 | A1 * | 5/2022 | Watts ................. | H04B 10/1123 |
| 2022/0236384 | A1 | 7/2022 | Sutton et al. | |
| 2023/0288638 | A1 * | 9/2023 | Balbás ................. | G02B 6/3542 |

OTHER PUBLICATIONS

Scantinel Photonics GMBH, International Search Report and Written Opinion, PCT/EP2022/070036, Nov. 16, 2022, 12 pgs.
Scantinel Photonics GMBH, Korean Office Action, KR Patent Application No. 10-2024-7003608, Jan. 20, 2026, 10 pgs.

* cited by examiner

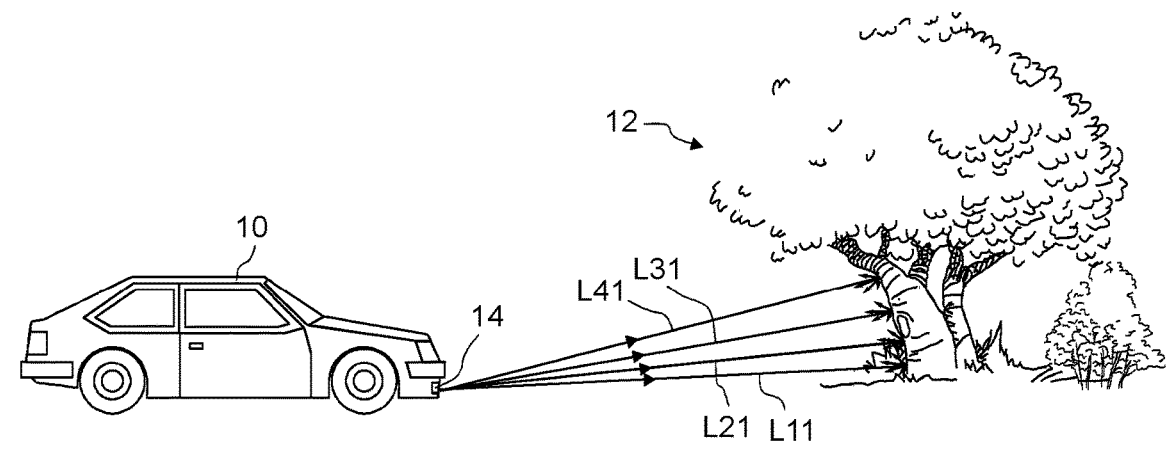
Fig. 1
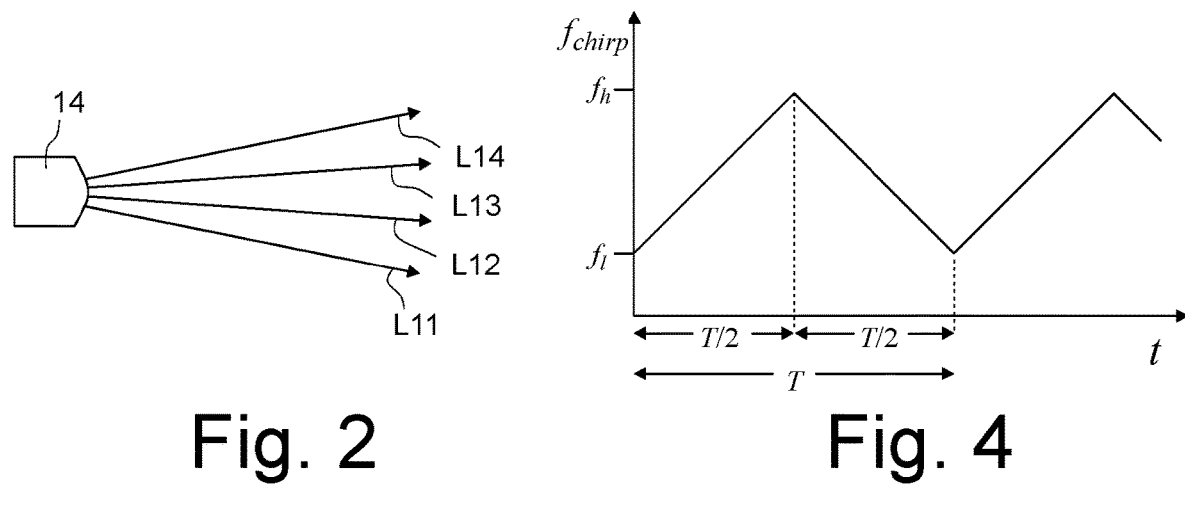
Fig. 2
Fig. 4
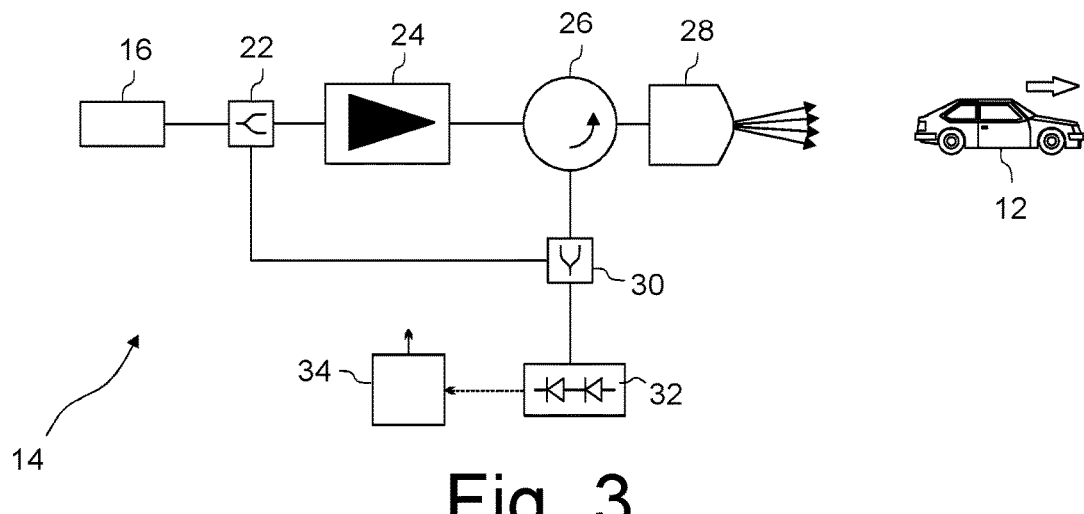
Fig. 3

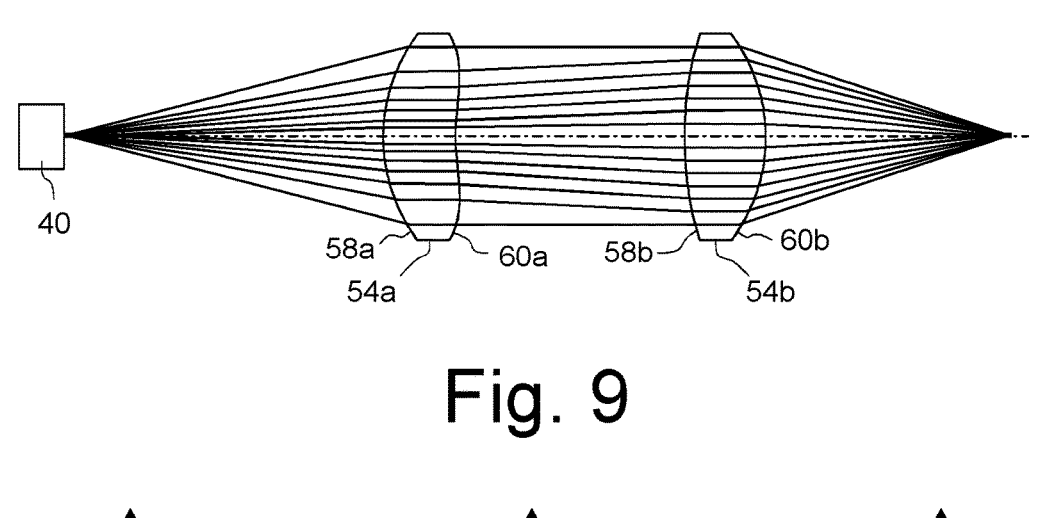
Fig. 9
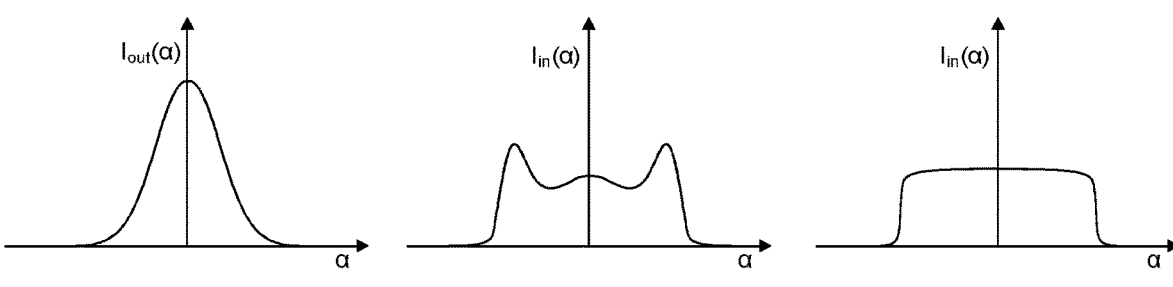
Fig. 10a Fig. 10b Fig. 10c
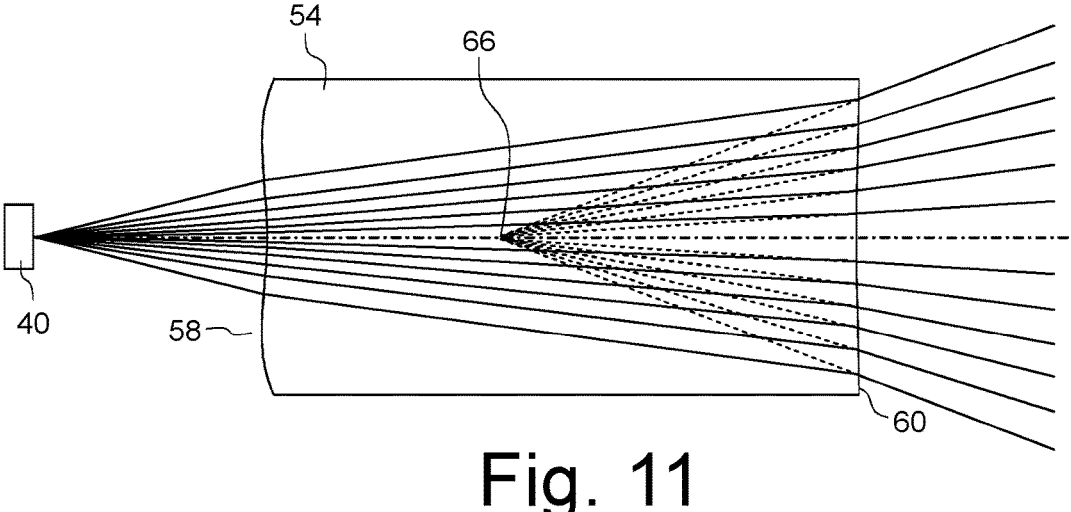
Fig. 11

LiDAR DEVICE FOR SCANNING MEASUREMENT OF A DISTANCE TO AN OBJECT

CROSS REFERENCE TO RELATED APPLICATIONS

This Application is a United States National Stage Application filed under 35 U.S.C. § 371 of PCT Patent Application Serial No. PCT/EP2022/070036 filed on Jul. 18, 2022, which claims the benefit of and priority to European Patent Application No. 21187955.6, filed Jul. 27, 2021, each of which is incorporated by reference herein in its entirety.

BACKGROUND OF THE INVENTION

1. Field of the Invention

The invention relates to a device for scanning measurement of the distance to a moving or stationary object based on FMCW LiDAR technology. Such devices can be used, for example, in autonomous driving vehicles and may be realized as photonic integrated circuits (PIC) having no or only very few moving components.

2. Description of the Prior Art

A measuring principle known as FMCW LiDAR has been proposed for optically measuring distances and velocities. In FMCW LiDAR devices optical signals with a time-varying frequency (FMCW stands for Frequency Modulated Continuous Wave) are directed by a scanner in different directions onto an object to be measured. After reflection at the object, the optical signals return to the scanner with low intensity and are superimposed with a signal that was not emitted (usually referred to as a local oscillator signal). The resulting beat frequency is detected by a detector and allows the distance between scanner and object to be calculated. If the Doppler shift is taken into account, the relative radial velocity between the scanner and the object can be calculated, too.

Scanners based on this measurement principle must be very robust and reliable if they are to be used in vehicles. This is particularly true if the vehicles are to drive autonomously, since safety in autonomous driving depends decisively on the scanner used to generate a three-dimensional image of the environment.

Scanners implemented as photonic integrated circuits do not require rotating scan mirrors or other moving components and are therefore particularly suitable for applications in vehicles. Such scanners are described in more detail, among others, in US 2017/0371227 A1 and US 2019/0377135 A1. In these scanners, a distribution matrix comprising several optical switches arranged in a tree-like manner is used to distribute the FMCW signals to different waveguide-to-free-space couplers. Collimating optics, which have a focal plane in which the couplers are arranged, collimate the optical signals emerging from the couplers and radiates them in different directions.

The intensity of the optical signals returning to the scanner after reflection from the object is very low. In order to obtain a high signal-to-noise ratio when detecting these signals, it is important that no additional light losses occur when coupling the signals into the optical waveguides leading to the detector(s).

A prerequisite for high coupling efficiency is that the waveguide-to-free-space couplers, which are used to couple the optical signals out of and into the waveguides, are located as precisely as possible in the focal plane of the collimating optics. Since photonically integrated waveguide-to-free-space couplers have so far been arranged along a straight line or in a plane for technical reasons, well-corrected collimating optics must be used that are capable of imaging an exactly flat object field to the far field or infinity. The object field of these optics is thus planar and not slightly curved, as is usually the case with simpler optical systems. Only with a planar object field it is possible to optimally position all waveguide-to-free-space couplers and thus obtain well-collimated light beams as well as minimal coupling losses.

However, collimating optics with an exactly flat object field have the disadvantage that they are large, heavy and expensive.

To solve this problem, WO 2021/029969 A1 proposes to arrange an array of microlenses between the waveguide-to-free-space couplers and the collimating optics. The microlenses image the waveguide-to-free-space couplers arranged in a plane into a curved field that coincides with a curved object field of the collimating optics. Although the waveguide-to-free-space couplers are arranged in a plane, a simply constructed collimating optics can be used that has only a few lenses, a small size, a low weight and can be manufactured at low cost.

Although this prior art solution has significant advantages with regard to the size, weight and cost of the collimating optics, it has turned out that the fraction of light that has been reflected at the object and couples into the waveguides is still not satisfactory.

SUMMARY OF THE INVENTION

It is therefore an object of the invention to provide a LiDAR device having an improved coupling efficiency for the light that has been reflected at the object.

This object is solved, according to the invention, by a LiDAR device for scanning measurement of a distance to an object. The device comprises a photonic integrated circuit comprising a plurality of optical waveguides and a plurality of couplers. Each coupler is associated with one of the optical waveguides and configured to couple light guided in the optical waveguide into free space and/or light propagating in free space into the optical waveguide. The device further comprises a collimating optical system configured to collimate light beams emitted by the couplers and/or to focus collimated light beams, and a plurality of microlenses. Each microlens is associated with one of the couplers and forms a real or virtual image of the associated coupler. The images of the couplers are arranged in an object field of the collimating optical system. Each coupler has a coupler numerical aperture and the collimating optical system has a collimator numerical aperture which is greater than each of the coupler numerical apertures. Each microlens has, on a side pointing towards the couplers, a coupler-side numerical aperture, and on a side pointing towards the collimating optical system a collimator-side numerical aperture that is greater than the coupler-side numerical aperture.

The invention is based on the discovery that a mismatch of the numerical aperture (NA) between the couplers and the collimating optical system is the most prominent contribution to insertion losses. While available couplers such as grating couplers typically have a small NA, it turns out that the collimating optical system must have a comparatively large NA. Only with such a comparatively large NA, it is possible to ensure light beams having a sufficiently large diameter. If the waist of the emitted laser beam is too small, the beam diameter will expand in the far field to several meters. With such beams, the desired spatial resolution cannot be accomplished.

By providing microlenses that have a coupler-side NA that is smaller than the collimators side NA, the mismatch between the NAs of the couplers and of the collimating optical system can be reduced. This results in an improved coupling efficiency. Thus, a higher fraction of light reflected at the object can be coupled into the waveguides and contribute to the superposition with the local oscillator signal, thereby improving the signal-to-noise ratio (SNR) and therefore the accuracy of the distance measurement.

Ideally, the coupler numerical aperture of each coupler is at least substantially equal to the coupler-side numerical aperture of the associated microlens, and the collimator numerical aperture is at least substantially equal to the collimator-side numerical aperture of the microlenses. In this case of a perfect NA match, the benefit for the coupling efficiency reaches its maximum.

However, a very significant increase of the coupling efficiency can also be achieved if a certain NA mismatch is tolerated. More specifically, the coupler numerical aperture of each coupler may differ from the coupler-side numerical aperture of the associated microlens by less than 10%, and the collimator numerical aperture may differ from the collimator-side numerical aperture of the microlenses by less than 10%. For example, the coupler NA of each coupler may be 0.09 and the coupler-side NA of the associated microlens may be 0.1, and the collimator NA may be 0.3 and the collimator-side NA of the microlenses may be 0.27. In spite of the small NA mismatch, a significant improvement of the coupling efficiency will be achieved.

In order to transform the smaller coupler NA into the larger collimator NA, the easiest approach is to use microlenses comprising two curved surfaces having a different refractive power. In other embodiments, the microlenses are not of the refractive type, but are formed by diffractive optical elements (DOEs) that produce the desired optical wavefront modification.

Generally, the light emitted by the device may be guided through first optical waveguides, and the light reflected from the object may be coupled into second optical waveguides that are different from the first waveguides. See, for example, applicant's DE 10 2020 110 142 filed 14 Apr. 2020. In such configurations there are couplers that only couple light from the first optical waveguides into the free space, and other couplers that couple light from the free space into the second optical waveguides.

In other embodiments, the optical waveguides guide both the emitted and the received light so that also the couplers have a double function.

In some embodiments, the couplers are arranged in a surface of the photonic integrated circuit and are configured to emit and/or to receive light beams each having a centroid ray that forms an angle with a local surface normal, wherein the angle is between 5° and 70°. Optical axes of the microlenses and directions of the associated centroid rays coincide and are parallel to an optical axis of the collimating optical system.

The rationale behind this arrangement is that most conventional grating couplers and also edge couplers emit or receive the light not perpendicular to the coupler surface, but obliquely. In other words, the centroid ray of the light beams is not parallel to the local surface normal, but forms an angle to it. It is then generally preferred if the optical axes of microlenses and directions of the associated centroid rays coincide, because this ensures an optimum coupling efficiency. Said surface of the photonic integrated circuit does not have to be completely planar, but may be stepped or even curved.

Generally, however, the surface will be planar. It is then preferred having a surface with a surface normal that forms a non-zero angle to the optical axis of the collimating optical system. The overall arrangement of the photonic integrated circuit and the collimating optical system will consequently be non-parallel.

In some embodiments the microlenses have different thicknesses. This is particularly useful if the microlenses do not only adapt the numerical aperture, but also to modify the field, as this is known as such from the above mentioned WO 2021/029969 A1. For example, the microlenses may transform the plane in which the couplers are arranged into a (spherically or aspherically) curved object plane of the collimating optical system.

Each microlens may be configured to transform an input angular light energy distribution produced by the associated coupler into an output angular light energy distribution that is flatter and/or broader than the input angular light energy distribution. Such a transformation of the angular light energy distribution further improves the coupling efficiency.

This is because the light reflected from the object returns to the device as more or less collimated plane waves with a broadened spatial intensity distribution over the collimator's free aperture compared to the outgoing spatial intensity distribution from the collimator. If the returned light is focused by the collimating optical system, the light beams will have an angular light energy distribution which is broader and can often be (at least approximately) described by a rectangular function (also referred to as top hat distribution). The angular light energy distribution associated with the couplers, however, is basically a Gaussian distribution and thus quite different from the top hat distribution. If this mismatch is not removed, coupling losses are inevitable.

By transforming the angular light energy distributions with the help of the microlenses, this mismatch may be removed or at least substantially reduced. The collimating optical system cannot be used for this transformation, because this would imply to violate the sine condition with the consequence that no sharp images could be produced.

Generally, two aspherical refracting surfaces are sufficient to achieve this transformation. Nevertheless, in some embodiments, two or more microlenses are associated with each coupler. This adds an additional degree of design freedom.

Some of the functions described above may be difficult to achieve with microlenses having spherical refractive surfaces. In many cases it will be therefore preferred to use at least some microlenses having at least one aspherical lens surface.

In some embodiments, the device comprises a transparent plane-parallel plate that is arranged between the microlenses and the collimating optical system. Such a plate may be helpful to reduce spherical aberration introduced by the microlenses. The plate may have a thickness and may consist of a material that are chosen such that a subsystem consisting of the microlenses and the plate has a smaller spherical aberration than the microlenses without the plate.

The concept of transforming the angular light energy distribution may be advantageously employed also without the adaptation of the numerical aperture. According to an aspect of the invention, a LiDAR device for scanning measurement of a distance to an object is provided. The device comprises a photonic integrated circuit comprising a plurality of optical waveguides and a plurality of couplers. Each coupler is associated with one of the optical waveguides and configured to couple light guided in the optical waveguide into free space and/or light propagating in free space into the optical waveguide. The device further comprises a collimating optical system configured to collimate light beams emitted by the couplers and/or to focus collimated light beams, and a plurality of microlenses. Each microlens is associated with one of the couplers and forms a real or virtual image of the associated coupler. The images of the couplers are arranged in an object field of the collimating optical system. Each microlens is configured to transform an input angular light energy distribution produced by the associated coupler into an output angular light energy distribution that is flatter and/or broader than the input angular light energy distribution.

BRIEF DESCRIPTION OF THE DRAWINGS

Various features and advantages of the present invention may be more readily understood with reference to the following detailed description taken in conjunction with the accompanying drawings in which:

FIG. 1 is a schematic side view of a vehicle approaching an object that is detected by a scanning device according to the invention;

FIG. 2 is a top view of the scanning device shown in FIG. 1;

FIG. 3 schematically illustrates the basic design of the scanning device according to various embodiments of the invention;

FIG. 4 is a graph showing the time variation of the frequency of the optical signals emitted by the scanning device shown in FIG. 3;

FIG. 9 is a meridional section through a pair of microlenses that modify the angular light energy distribution according to a fourth embodiment;

FIGS. 10a, 10b and 10c are graphs illustrating a Gaussian, a broadened and a top hat angular light distribution, respectively;

FIG. 11 is a meridional section through a microlens forming a virtual image of a waveguide-to-free-space coupler according to a firth embodiment;

DETAILED DESCRIPTION OF PREFERRED EMBODIMENTS

1. Exemplary Use Scenario

Figure 5:
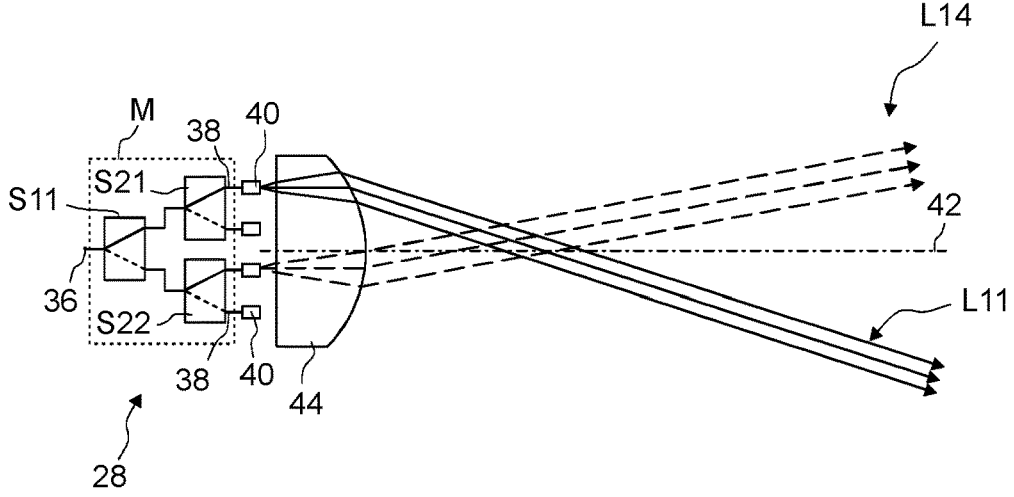
FIG. 5 schematically shows a distribution matrix and other important components of the deflection unit contained in the scanning device.

FIG. 1 is a schematic side view of a vehicle 10 approaching an object 12 that is represented by a tree. The vehicle 10 has at least one scanning device 14 that uses light beams L11, L21, L31 and L41 to scan the environment ahead of the vehicle 10. From the distance information generated by the scanning device 14 a three-dimensional image of the environment may be calculated. In addition, the scanning device 14 determines the relative speed to the object 12. This information is particularly important if the object 12 is another vehicle, an animal or a pedestrian that is also moving.

The information determined by the scanning device 14 about the environment ahead of the vehicle 10 can be used, for example, to assist the driver of the vehicle 10 in controlling the vehicle. For example, warning messages may be generated when a collision of the vehicle 10 with the object 12 is imminent. If the vehicle 10 is driving autonomously, the information about the environment ahead is required by the control algorithms that control the vehicle 10.

As can be seen in FIG. 1, the scanning device 14 emits light beams L11 to L41 in different directions in a vertical plane (in FIG. 1 this is the paper plane) in order to scan the environment in a vertical direction. At the same time, scanning also takes place in a horizontal direction, as shown in FIG. 2 in a top view of the scanning device 14. Four light beams L11, L12, L13 and L14 are shown which are emitted in different directions in a horizontal plane.

For reasons of clarity, it is assumed in FIGS. 1 and 2 that only four light beams Ln1 to Ln4 in four different planes—i.e. a total of 16 light beams—are generated by the scanning device 14. However, in reality the scanning device 14 emits significantly more light beams.

For example, $k \cdot 2^n$ light beams are preferred, where n is a natural number between 7 and 13 and indicates how many beams are emitted in one of k planes, where k is a natural number between 1 and 16.

2. Scanning Device

FIG. 3 schematically shows the basic design of the scanning device 14 according to an embodiment of the invention. The scanning device 14 is designed as a LiDAR system and comprises an FMCW light source 16 which generates measuring light having a varying frequency $f_{chirp}$ during operation of the scanning device 14. As illustrated in FIG. 4, the frequency $f_{chirp}$ varies ("chirps") periodically over time t between a lower frequency $f^1$ and a higher frequency $f_h$.

In this embodiment, each measurement interval with a chirp duration T is divided into two halves of equal length T/2. During the first interval the frequency $f_{chirp}$ increases linearly with a constant and positive upchirp rate $r_{chirp} = f_{chirp}/dt$. During the second interval, the frequency $f_{chirp}$ decreases linearly with a constant negative downchirp rate $-r_{chirp}$. The frequency of the measured light can thus be described by a periodic triangular function. However, other functional relationships are also contemplated, e.g. sawtooth functions.

The light source 16 is connected to a splitter 22 that splits the measuring light into reference light (also referred to as local oscillator) and output light. In the illustrated embodiment, the output light is amplified by an optical amplifier 24 and then passes to an optical circulator 26 that directs the amplified measurement light to a deflection unit 28. An optical circulator has three ports A, B, and C and the property that light entering one port leaves the next port. Therefore, light entering port A exits port B, light entering port B exits port C, and light entering port C exits port A. The optical circulator 26 may include a polarization-sensitive beam splitter that interacts with other polarization optical elements, as is known per se in the art. Instead of the circulator, a 2×2 coupler can also be used, for example, but this results in higher light losses.

The deflection unit 28 directs the output light onto the object 12—represented in FIG. 3 by a moving car—along different directions, as it has been explained above with reference to FIGS. 1 and 2. Typically, the optical signal emitted by the deflection unit 28 is at least partially diffusely reflected by the object 12. A small portion of the reflected signal returns to the scanning device 14, where it is re-coupled into the deflection unit 28.

The optical circulator 26 directs this reflected light portion to a combiner 30 where this light portion is superimposed with the reference light that has been separated from the measurement light by the splitter 22. Since the frequencies of the superimposed light components are slightly different due to the different optical path lengths, a beat signal is generated which is detected by a symmetrical photodetector or another type of detector 32. The electrical signals generated by the detector 32 are fed to a calculation unit 34, which calculates the distance R to the object and the relative radial velocity v between the scanning device 14 and the object 12 on the basis of the detected beat frequencies.

FIG. 5 schematically shows important components of the deflection unit 28. It comprises a distribution matrix M in which several optical switches S11, S21 and S22 are arranged in a tree-like manner. With the aid of the optical distribution matrix M, optical signals entering at an input 36 of the distribution matrix M can be successively distributed to a plurality of optical waveguides 38. For reasons of clarity, the optical distribution matrix M has only three optical switches in FIG. 5, enabling a distribution of the optical signals to four optical waveguides 38. In real scanning devices 14, eight or more switching levels may be arranged in series so that, for example, 256 optical waveguides 38 can be selectively connected to the input 36.

In other embodiments, the distribution matrix M is located upstream of the amplifier 24 or between the amplifier 24 and the circulator 26. This is particularly advantageous if multiple optical signals are to be emitted simultaneously by supplying optical signals in parallel to multiple distribution matrices. Still other possible designs for the integration of distribution matrices into the scanning device 14 can be gleaned from European patent application EP 20176355.4 and from DE 10 2020 110 142 A1, which are both assigned to the applicant.

Each optical waveguide 38 terminates in a waveguide-to-free-space coupler 40 that couples the optical signals guided in the associated optical waveguide 38 into free space. Such waveguide-to-free-space couplers 40 are known in the prior art and can be designed, for example, as grating couplers, which have a widening waveguide area followed by a grating structure. Alternatively, the waveguide-to-free-space couplers 40 may be edge couplers, which typically have a higher coupling efficiency than grating couplers.

FIG. 5 further illustrates that the divergent light beams emerging from the waveguide-to-free-space couplers 40 are collimated by a collimating optical system 44 and emitted in different directions. The further away a waveguide-to-free-space coupler 40 is arranged from an optical axis 42 of the collimating optical system 44, the greater is the angle at which the collimated light beams are emitted by the collimating optical system 44.

In the illustrated embodiment, the deflection unit 28 also serves to receive the optical signals reflected from the object 12 and to couple them back into the optical waveguides 38 via the waveguide-to-free-space couplers 40. In other embodiments, the reflected signals are received by separate and independent waveguide-to-free-space couplers 40 and fed to the detector 32 via own waveguides.

Some components of the scanning device 14 are realized as a photonic integrated circuit (PIC). The PIC may comprise a silicon substrate on which SiN waveguides are formed, but other material combinations are also known in the art. Ideally, all components with the exception of the collimating optical system 44 are part of the PIC. However, due to technological restraints, more sophisticated components such as the light source 16, the optical circulator 26 or the detector 32 may be external to the PIC.

3. Microlens Array—First Embodiment

Figure 6:
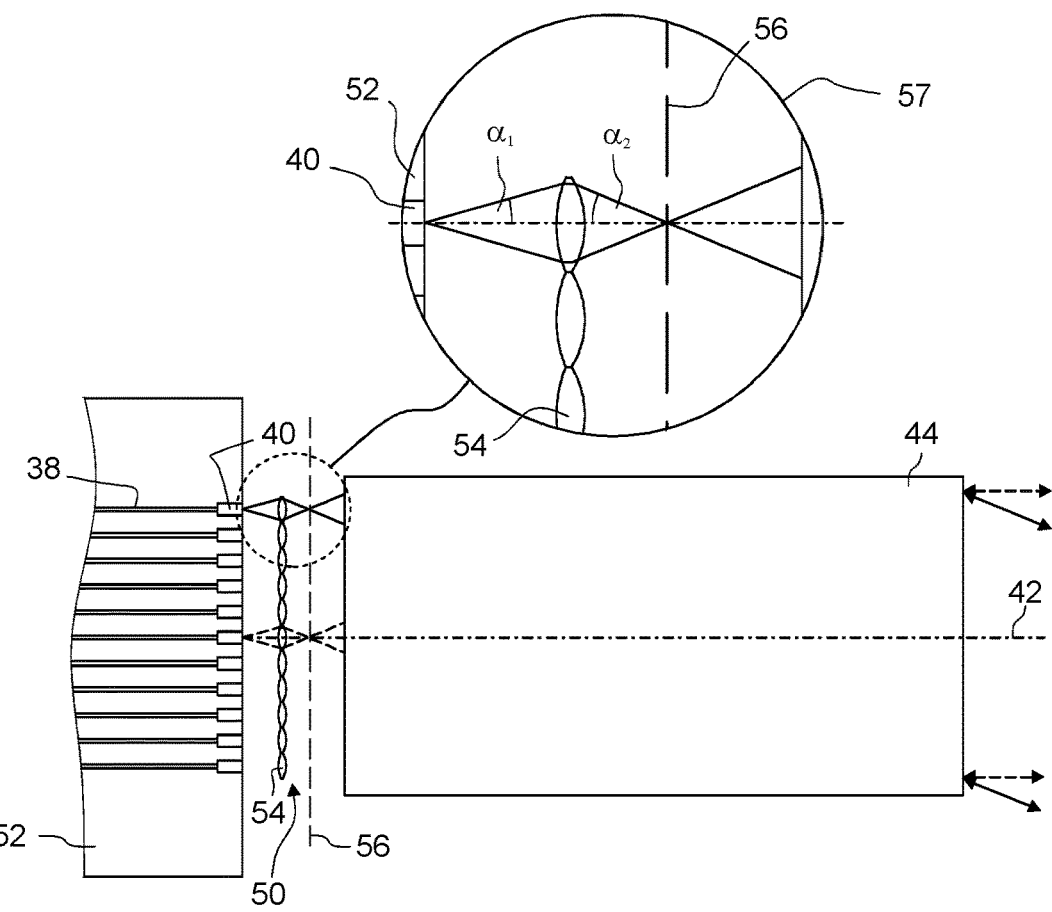
FIG. 6 schematically shows a microlens array arranged between an end portion of a photonic integrated circuit and a collimating optical system according to a first embodiment.

FIG. 6 schematically shows a microlens array 50 that is arranged between an end portion of the PIC 52 and the collimating optical system 44 which is, for the sake of simplicity, represented by an empty box. The plurality of optical waveguides 38 and the waveguide-to-free-space couplers 40 are formed on the PIC 52 such that each waveguide-to-frees space coupler 40 is associated with one of the optical waveguides 38. In this first embodiment, each waveguide-to-free-space coupler 40 is configured to couple light guided in the associated optical waveguide 38 into free space, and also to couple light propagating in free space into the associated optical waveguide 38.

The microlens array 50 comprises a plurality of identical microlenses 54 that are arranged along a straight line next to one another. Each microlens 54 is associated with one of the waveguide-to-free-space couplers 40 and forms a real image of the associated coupler 40. The images of the waveguide-to-free-space couplers 40 are located in an object field 56 of the collimating optical system 44. In the embodiment shown, the object field 56 is planar. In other embodiments described further below, the object field 56 is three-dimensionally curved.

As can best be seen in the enlarged cutout 57, each waveguide-to-free-space coupler 40 has a coupler numerical aperture $NA_1$ so that the light is emitted with a maximum angle $\alpha_1$, wherein $NA_1=\sin(\alpha_1)$, assuming that the surrounding air has a refractive index n=1. This implies that light returning from the object 12 cannot enter the waveguide-to-free-space couplers 40 if the angle exceeds $\alpha_1$.

The collimating optical system 44, which may be double-sided telecentric, has a collimator numerical aperture $NA_2$ wherein $NA_2=\sin(\alpha_2)$. $NA_2$ is greater than $NA_1$ or, in embodiments in which the waveguide-to-free-space couplers 40 have different numerical apertures, greater than any of these numerical apertures $NA_1$. The collimator numerical aperture $NA_2$ is given by $\Phi_{EP}/(2 \cdot f)$, with $\Phi_{EP}$ being the diameter of the entrance pupil and $f$ being the focal length of the collimating optical system 44. The numerical aperture $NA_2$ must be relatively large, because only with a large entrance pupil it is possible to ensure light beams having a divergence that is sufficiently small.

Under such conditions, and in the absence of the microlens array 50, a fraction of the light reflected from the object 12 and passing the collimating optical system 44 would be incident on the waveguide-to-free-space couplers 40 with angles $\alpha_2 > \alpha_1$. This fraction could not be coupled into the optical waveguides 38 and would thus not contribute to the superposition with the reference signal. Furthermore, the beam divergence of the collimated beam would be so large that the device 14 could not achieve the required spatial resolution.

The microlenses 54 adapt the numerical apertures such that insertion losses caused by the NA mismatch are avoided. To this end, the microlenses 54 have, on a side pointing towards the waveguide-to-free-space couplers 40, a coupler-side numerical aperture $NA_{m1}$, and on a side pointing towards the collimating optical system 44 a collimator-side numerical aperture $NA_{m2}$ that is greater than the coupler-side numerical aperture $NA_{m1}$. Ideally, the conditions $NA_1 = NA_{m1}$ and $NA_2 = NA_{m2}$ at least substantially hold so that a perfect—or at least a very good—NA match is achieved. Then no insertion loss will be caused by NA mismatch, resulting in more light received by the scanning device 14, and consequently in a higher SNR and an improved accuracy.

In order to achieve the different NAs on the coupler side and on the collimator side, the microlenses 54 have surfaces with different refractive curvatures 58, 60, (i.e. different refractive power), with the stronger curvature on the surface 60 pointing towards the collimating optical system 44. Usually it will be preferred to use aspherical surfaces 58, 60 in order to reduce spherical aberration. Spherical surfaces may be sufficient if the spherical aberrations of the optical system 44 and the microlenses 54 compensate each other.

The maximum diameter of the microlenses 54 primarily depends on the lateral distance of adjacent optical waveguides. If there are 256 optical waveguides 38, for example, the diameter of the microlenses 54 might be roughly about 50 μm if the array is 12.8 mm long.

In FIG. 6 it is assumed that the microlenses 54 are linearly arranged along a straight line. With such a deflection unit 28, scanning is only possible in a single plane, e.g. horizontally. For achieving scanning in the perpendicular scan direction, another scan mechanism, e.g. a rotating scan mirror, would be required.

In other embodiments, the waveguide-to-free-space couplers 40 are arranged two-dimensionally in a plane. To this end, a complex 3D PIC may be used, or a plurality of 2D PICs may be stacked one on top of one another. Then also the microlenses 54 each being associated with a single waveguide-to-free-space coupler 40 will be arranged in a two-dimensional array. In such embodiments, no mechanical components such as rotating scan mirrors are required, because scanning in both directions is accomplished by the waveguide-to-free-space couplers 40 covering the entire object field (and not only a line) of the collimating optical system 44.

4. Microlens Array—Second Embodiment

Figure 7:
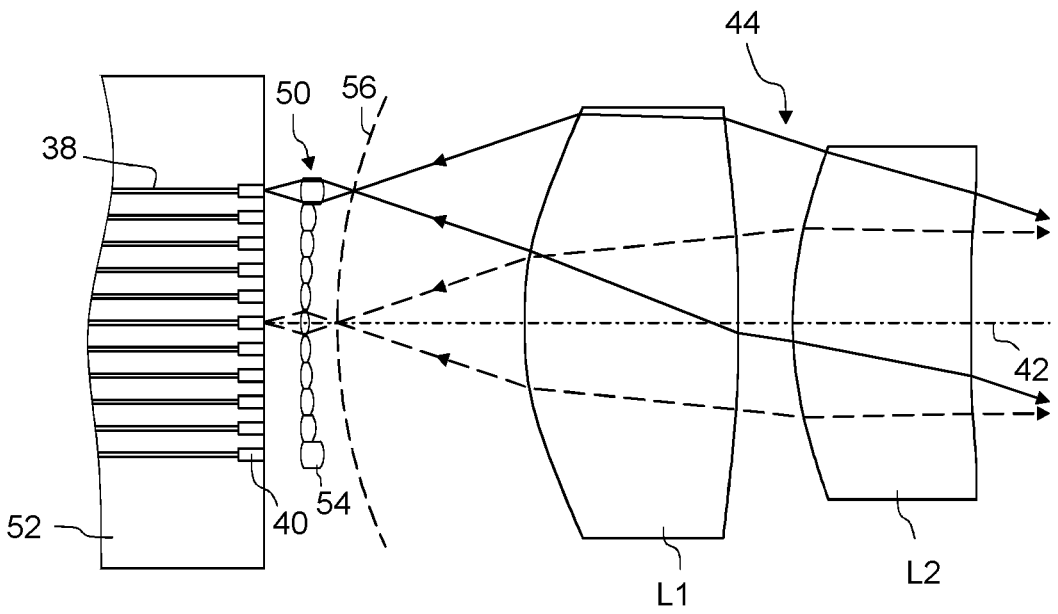
FIG. 7 schematically shows, in a representation similar to FIG. 6, a microlens array arranged between an end portion of a photonic integrated circuit and a collimating optical system according to a second embodiment in which the collimating optical system has a curved object field.

FIG. 7 schematically shows, in a representation similar to FIG. 6, a microlens array 50 according to a second embodiment in which the collimating optical system 44 has a curved object field 56. Allowing a curved object field 56 makes it possible to design the collimating optical system 44 with very few—in the embodiment shown with only two—lenses L1 and L2 which may have at least one aspherical surface. This reduces size, weight and cost of the collimating optical system 44.

The microlenses 54 in this embodiment do not only reduce or eliminate the numerical aperture mismatch, but are also used to image the waveguide-to-free-space couplers 40, which are again arranged along a straight line or three-dimensionally in a plane on the curved object field 56, on a curved field. One approach of achieving this is an arrangement in which the waveguide-to-free-space couplers 40 are arranged in the front focal plane of the front surface 58 of the microlenses 54. Then the images of the waveguide-to-free-space couplers 40 can be axially positioned by changing the thickness of the microlenses 54, i.e. by using different distances between the surfaces 58, 60. In certain cases, it may be necessary to adapt the surface shapes of the surfaces 58, 60, too.

5. Microlens Array—Third Embodiment

Figure 8:
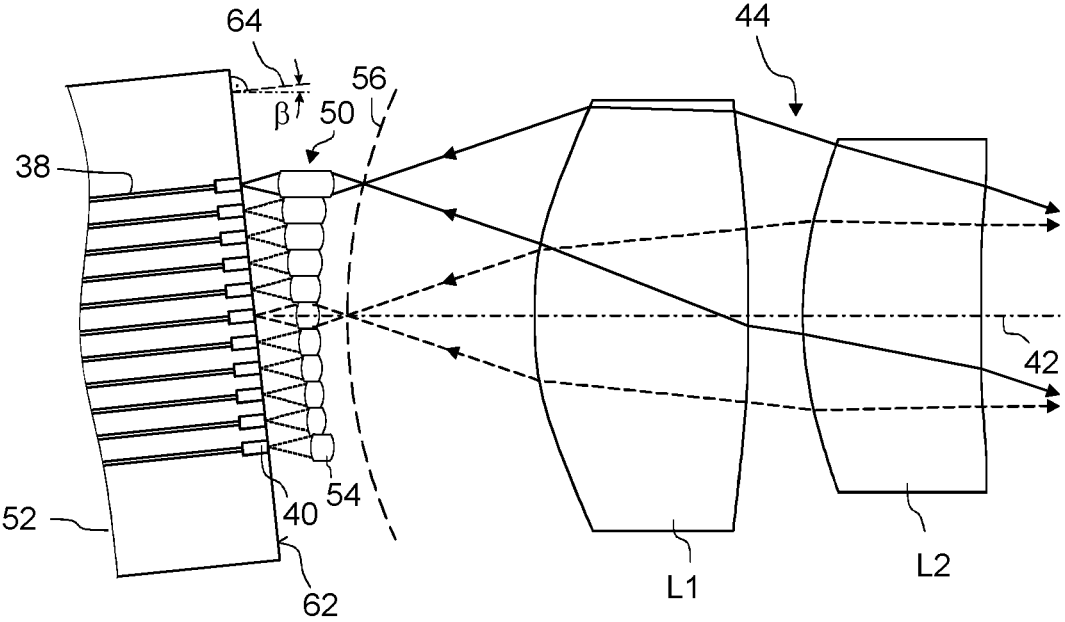
FIG. 8 schematically shows, in a representation similar to FIG. 6, a microlens array arranged between an end portion of a photonic integrated circuit and a collimating optical system according to a third embodiment in which a surface normal of the photonic integrated circuit is inclined with respect to an optical axis of the collimating optical system.

FIG. 8 schematically shows, in a representation similar to FIG. 6, a microlens array 50 according to a third embodiment. In this embodiment the PIC 52 has a surface 62 in which the waveguide-to-free-space couplers 40 are arranged. In the embodiment shown, the surface 62 is planar and aligned not perpendicular to the optical axis 42 of the collimating optical system 44. Put differently, a surface normal 64 forms an angle $\beta > 0$ with the optical axis 44, as this is illustrated in FIG. 8.

Such an inclined arrangement is advantageous because most waveguide-to-free-space couplers 40 emit the light beams—or more precisely the centroid rays of the light beams—not parallel, but at an angle with a local surface normal. This angle with the optical axis 42 of the collimating optical system 44 can be easily compensated by tilting the entire PIC 52 by the angle $\beta$ from its conventional arrangement as shown in FIG. 7. At a certain tilt angle, the centroid rays of the light beams coincide with the optical axes of the microlenses 54 and are parallel to the optical axis 42 of the collimating optical system 44. This avoids the need for correcting non-rotationally symmetrical aberrations due to oblique rays through the microlenses.

However, tilting the PIC 52 also results in a tilt of the field that is imaged by the microlens array 50 on the object field 56 of the collimating optical system 44. As it is shown in FIG. 8, it is possible to image the tilted field, in which waveguide-to-free-space couplers 40 are arranged, on the curved object 56 field by axially positioning microlenses 54 having different thicknesses.

This approach also works if the surface 62 of the PIC 52 is not planar, but stepped or even curved.

6. Microlens Array—Fourth Embodiment

In the foregoing embodiments, exactly one microlens 54 is associated with each waveguide-to-free-space coupler 40. If there is not only one, but two or more microlenses associated with each waveguide-to-free-space coupler 40, more design options and further functions are available. FIG. 9 illustrates a pair of microlenses 54a, 54b that are associated to a single waveguide-to-free-space coupler 40.

For example, the microlenses 54 may be configured to transform an input angular light energy distribution produced by the associated waveguide-to-free-space coupler 40 into an output angular light energy distribution that is flatter and/or broader than the input angular light energy distribution.

Such a transformation of the angular light energy distribution further improves the coupling efficiency. The angular light energy distribution associated with the waveguide-to-free-space couplers 40 is typically a Gaussian distribution, as this is illustrated in FIG. 10*a* showing the intensity $I_{out}$ as a function of the emission angle $\alpha$. On the other hand, the light reflected from the object 12 and returning to the scanner device 14 arrives there substantially collimated, i.e. as plane waves. If plane waves are focused by the collimating optical system 44, the light beams emerging from the collimating optical system 44 will have an angular light energy distribution which is broader and can often be (at least approximately) described by a top hat distribution, as this is illustrated in FIG. 10*c* showing the intensity $I_{in}$ as a function of the angle $\alpha$. However, the waveguide-to-free-space couplers 40 are adapted to emit and to receive light having a Gaussian angular distribution. If this mismatch is not removed, additional insertion losses are inevitable.

The pair of microlenses 54*a*, 54*b* shown in FIG. 9 transforms a diverging beam, which is produced by the waveguide-to-free-space couplers 40 and has Gaussian angular light energy distribution as shown in FIG. 10*a*, into a light energy distribution (FIG. 10*b*) that is flatter and broader than the Gaussian angular light energy distribution. To this end, the diverging Gaussian beam is collimated by the first surface 58*a*. The second surface 60*a* and third surface 58*b* redistribute the spatial light distribution, and the last surface 60*b* focuses the light again, thereby transforming the redistributed spatial light distribution into an output distribution having the desired aperture angle and broader angular distribution. For redistributing the spatial light distribution, the surface 60*a* of the first microlens 54*a* has a concave center area that refracts the light away from the optical axis. The surface 58*b* of the second microlens 54*b* re-collimates this portion of the light.

Since a single refracting surface cannot fulfill the sine condition, the embodiment shown in FIG. 9 can, with the additional requirement of a very good correction of the wavefront of the focused beam, transform the Gaussian angular input distribution shown in FIG. 10*a* only into a broader and roughly rectangular distribution with deviations in the middle and at the edges, as this is illustrated in FIG. 10*b*.

A substantially rectangular angular distribution as in FIG. 10*c* and also a very good correction of the focused beam can be achieved by modifying the embodiment shown in FIG. 9 in the following manner. In such a modified embodiment, the surfaces 58*a*, 60*b* are planar and a positive lens having two curved surfaces and fulfilling the sine condition is put in front of surface 58*a*. Another lens fulfilling the since condition is placed after surface 60*b*. Alternatively, three or more microlenses each having two curved surfaces may be used. Then plane waves returning from the object with (in the limiting case) rectangular spatial intensity distributions across the collimator free aperture can be focused by the collimating optical system 44 such that the light beams have, at least at a very good approximation, a top hat angular light energy distribution. The additional microlens between the microlens 54*b* and the collimating optical system 44 transforms this angular top hat into a spatial top hat distribution. The curved surfaces 60*a*, 58*b* of the microlenses 54*a* and 54*b*, respectively, transform this top hat spatial light energy distribution into a Gaussian spatial light energy distribution. The latter is transformed by the additional microlens, which is arranged between the microlens 54*a* and the waveguide-to-free-space coupler 40, into a Gaussian angular distribution that can be perfectly received by the waveguide-to-free-space coupler 40.

7. Microlens Array—Fifth Embodiment

While the provision of two or more lenses may be useful in many cases, the transformation of the angular light energy distribution can also be achieved with only one microlens per waveguide-to-free-space coupler 40. FIG. 11 illustrates a microlens 54 having two aspherical surfaces 58, 60 and forming a virtual image 66 of the waveguide-to-free-space coupler 40. The single microlenses 54 transforms the Gaussian angular light energy distribution produced by the waveguide-to-free-space coupler 40 into a top hat angular light energy distribution, and vice versa in the back direction.

8. Microlens Array—Sixth Embodiment

Figure 12:
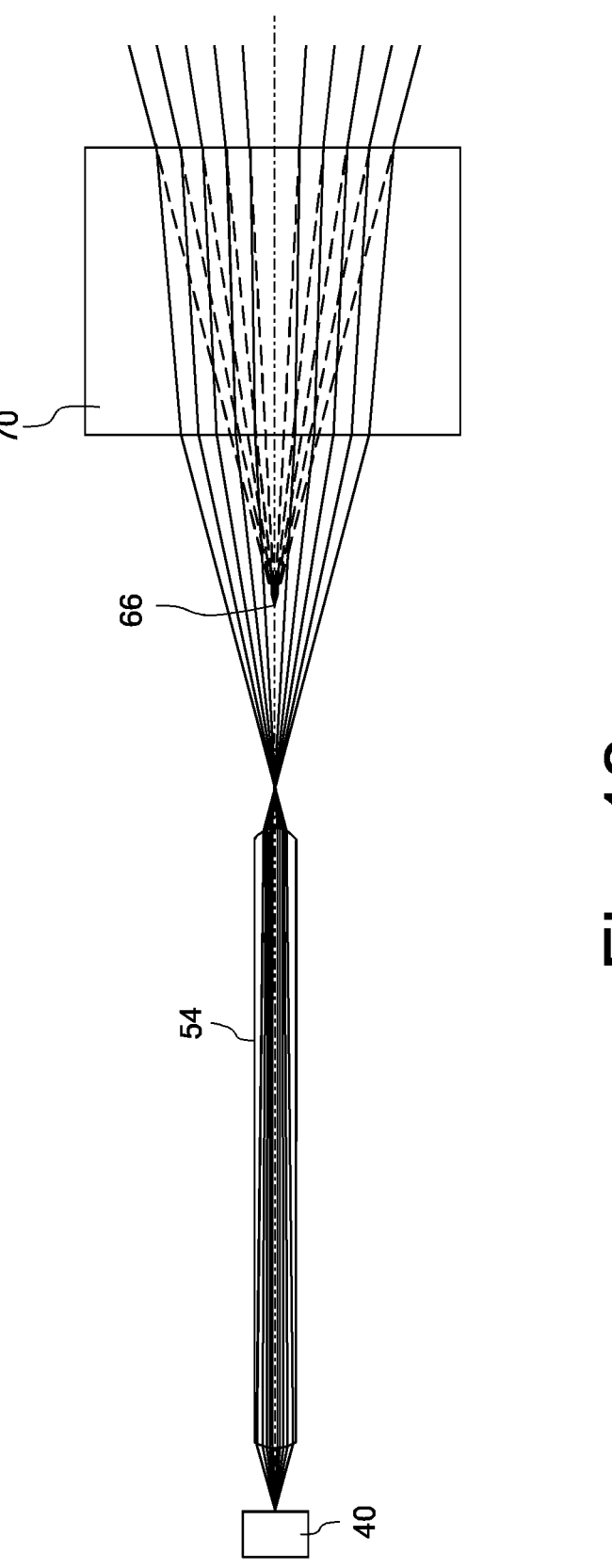
FIG. 12 is a meridional section through a microlens and a plane-parallel plate arranged between the microlens and the collimating optical system according to a sixth embodiment.

FIG. 12 illustrates another embodiment in which a single microlens 54 having aspherical surfaces fulfills both the function of adapting the numerical aperture and the angular light energy distribution. In this embodiment, the microlens 54 produces a real image of the waveguide-to-free-space coupler 40. The scanner device 14 comprises a transparent plane-parallel plate 70 that is arranged between the microlens 54 and the collimating optical system 44. Such a plate 70 may be helpful to relax the necessary spherical aberration correction for the microlens 54, because the plate 70 produces a negative spherical aberration which may at least partially compensate the positive spherical aberration produced by positive lenses. This may allow for the use of at least one purely spherical surface in the microlens 54. The virtual image formed by the plate 70 is indicated with 66.

In cases in which no compensation of the spherical aberration is required, the optical design shown in FIG. 12 can be used advantageously also without the plate 70.

9. Microlens Array—Seventh Embodiment

Figure 13:
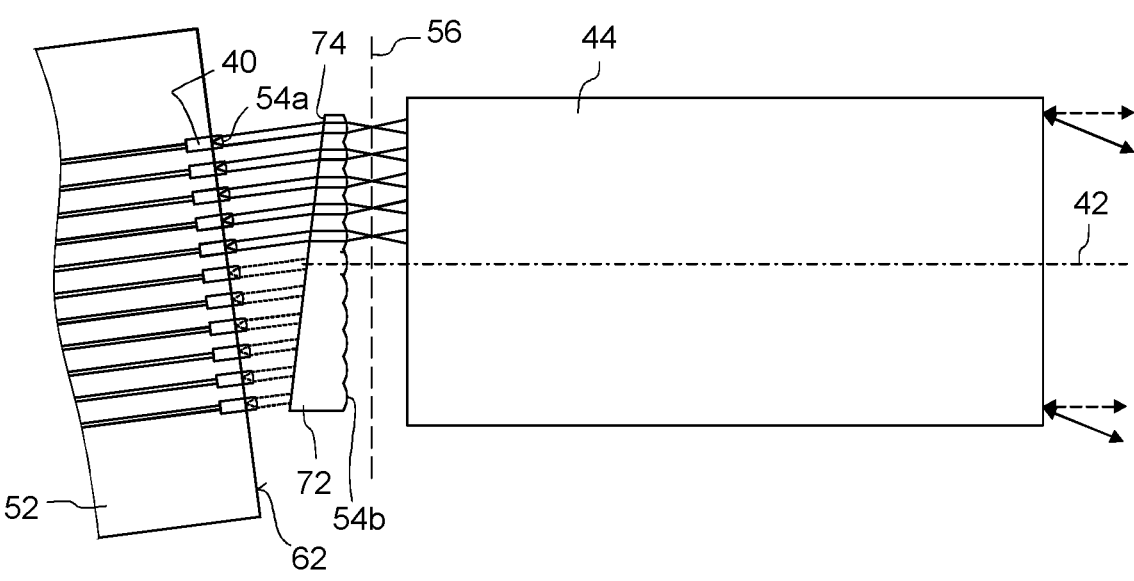
FIGS. 13 and 14 schematically show, in representations similar to FIG. 6, two variants of a microlens array arranged between an end portion of a photonic integrated circuit and a collimating optical system according to a seventh embodiment in which microlenses are formed on a surface of the photonic integrated circuit.
Figure 14:
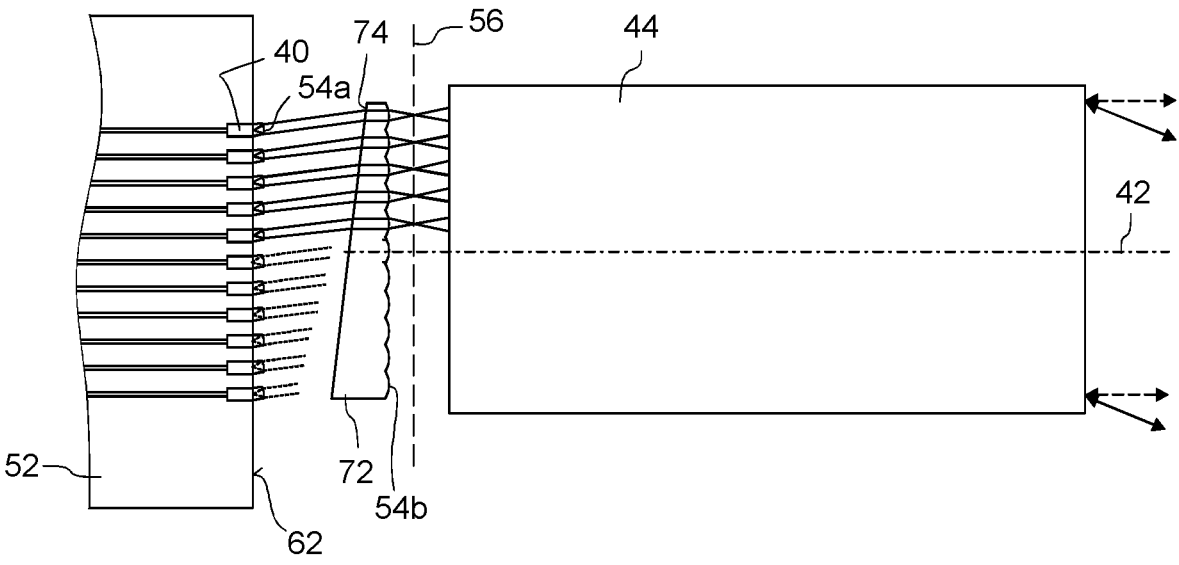

FIGS. 13 and 14 illustrate, in representations similar to FIGS. 6 to 8, embodiments in which first microlenses 54*a* having only one curved surface are directly attached on the surface 62 of the PIC 52 or are integrally formed therewith. The first microlenses 54*a* collimate the light beams emitted from the waveguide-to-free-space couplers 40.

Second microlenses 54*b* are integrally formed on one side of a transparent wedge 72 that is arranged in the space between the PIC 52 and the collimating optical system 44. The second microlenses 54*b* form the images of the waveguide-to-free-space couplers 40 in the object field 56 of the collimating optical system 44.

The opposite side of the wedge 72 is formed by a planar surface 74 that is arranged inclined with respect to the propagation direction of the collimated light beams. This inclined arrangement ensures that no reflections from the planar surface 74 can reach the waveguide-to-free-space couplers 40.

In the embodiment shown in FIG. 13, the waveguide-to-free-space coupler 40 emit the light beams in a direction perpendicular to the surface 62 of the PIC 52. Therefore the PIC 52 is tilted with respect to the optical axis 42 of the collimating optical system 44.

In the embodiment shown in FIG. 14, the waveguide-to-free-space coupler 40 emit the light beams obliquely to the surface 62 of the PIC 52. The wedge angle of wedge 72 is selected such that the beam tilt caused by the planar surface 74 compensates the beam tilt produced by the waveguide-to-free-space couplers 40. The surface 62 of the PIC 54 can therefore be arranged perpendicular to the optical axis 42 of the collimating optical system 44.

The invention claimed is:

1. A LiDAR device for scanning measurement of a distance to an object, wherein the device comprises:

a photonic integrated circuit comprising a plurality of optical waveguides and a plurality of couplers, wherein each coupler is associated with one of the optical waveguides and configured to couple light guided in the optical waveguide into free space and/or light propagating in free space into the optical waveguide, a collimating optical system configured to collimate light beams emitted by the couplers and/or to focus collimated light beams, and a plurality of microlenses, wherein each microlens is associated with one of the couplers and forms a real or virtual image of the associated coupler, wherein the images of the couplers are arranged in an object field of the collimating optical system, wherein each coupler has a coupler numerical aperture and the collimating optical system has a collimator numerical aperture which is greater than each of the coupler numerical apertures, and wherein each microlens has, on a side pointing towards the couplers, a coupler-side numerical aperture, and on a side pointing towards the collimating optical system a collimator-side numerical aperture that is greater than the coupler-side numerical aperture.

2. The device of claim 1, wherein the coupler numerical aperture of each coupler differs from the coupler-side numerical aperture of the associated microlens by less than 10%, and wherein the collimator numerical aperture differs from the collimator-side numerical aperture of the microlenses by less than 10%.

3. The device of claim 1, wherein each microlens comprises two curved surfaces having a different refractive power.

4. The device of claim 1, wherein the couplers are arranged in a surface of the photonic integrated circuit, the couplers are configured to emit and/or to receive light beams each having a centroid ray that forms an angle with a local surface normal, wherein the angle is between 5° and 70°, and wherein optical axes of the microlenses and directions of the associated centroid rays coincide and are parallel to an optical axis of the collimating optical system.

5. The device of claim 4, wherein the surface is planar and has a surface normal that forms a non-zero angle to the optical axis of the collimating optical system.

6. The device of claim 1, wherein the microlenses have different thicknesses.

7. The device of claim 1, wherein each microlens is configured to transform an input angular light energy distribution produced by the associated coupler into an output angular light energy distribution that is flatter and/or broader than the input angular light energy distribution.

8. The device of claim 7, wherein the output angular light energy distribution is a rectangular distribution.

9. The device of claim 7, wherein two or more microlenses are associated with each coupler.

10. The device of claim 1, wherein at least some microlenses have at least one aspherical lens surface.

11. The device of claim 1, wherein the object field of the collimating optics is curved.

12. A LiDAR device for scanning measurement of a distance to an object, wherein the device comprises:

a photonic integrated circuit comprising a plurality of optical waveguides and a plurality of couplers, wherein each coupler is associated with one of the optical waveguides and configured to couple light guided in the optical waveguide into free space and/or light propagating in free space into the optical waveguide, a collimating optical system configured to collimate light beams emitted by the couplers and/or to focus collimated light beams, and a plurality of microlenses, wherein each microlens is associated with one of the couplers and forms a real or virtual image of the associated coupler, wherein the images of the couplers are arranged in an object field of the collimating optical system, wherein each coupler has a coupler numerical aperture and the collimating optical system has a collimator numerical aperture which is greater than each of the coupler numerical apertures, and wherein each microlens has, on a side pointing towards the couplers, a coupler-side numerical aperture, and on a side pointing towards the collimating optical system a collimator-side numerical aperture that is greater than the coupler-side numerical aperture, and the LiDAR device comprising a transparent plane-parallel plate that is arranged between the microlenses and the collimating optical system.

13. A LiDAR device for scanning measurement of a distance to an object, wherein the device comprises:

a photonic integrated circuit comprising a plurality of optical waveguides and a plurality of couplers, wherein each coupler is associated with one of the optical waveguides and configured to couple light guided in the optical waveguide into free space and/or light propagating in free space into the optical waveguide, a collimating optical system configured to collimate light beams emitted by the couplers and/or to focus collimated light beams, and a plurality of microlenses, wherein each microlens is associated with one of the couplers, forms a real or virtual image of the associated coupler, wherein the images of the couplers are arranged in an object field of the collimating optical system, and is configured to transform an input angular light energy distribution produced by the associated coupler into an output angular light energy distribution that is flatter and/or broader than the input angular light energy distribution.

14. The device of claim 13, wherein the output angular light energy distribution is a rectangular distribution.

15. The device of claim 13, wherein two or more microlenses are associated with each coupler.

* * * * *